United States Patent
Ferreol

(10) Patent No.: US 6,744,407 B2
(45) Date of Patent: Jun. 1, 2004

(54) METHOD AND DEVICE FOR SPACE-TIME ESTIMATION OF ONE OR MORE TRANSMITTERS

(75) Inventor: Anne Ferreol, Colombes (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/128,259

(22) Filed: Apr. 24, 2002

(65) Prior Publication Data

US 2003/0052820 A1 Mar. 20, 2003

(30) Foreign Application Priority Data

Apr. 27, 2001 (FR) .............................. 01 05731

(51) Int. Cl.$^7$ .............. G01S 5/04; G01S 5/02
(52) U.S. Cl. .................. 342/441; 342/424; 342/440
(58) Field of Search .................. 342/441, 424, 342/440, 377, 378

(56) References Cited

U.S. PATENT DOCUMENTS

| | | |
|---|---|---|
| 5,752,168 A | 5/1998 | Monot et al. |
| 6,205,341 B1 | 3/2001 | Monot et al. |
| 6,239,746 B1 | 5/2001 | Pipon et al. |
| 6,240,098 B1 | 5/2001 | Thibault et al. |
| 6,253,084 B1 | 6/2001 | Monot |
| 6,349,207 B1 | 2/2002 | Monot et al. |

OTHER PUBLICATIONS

E. Gonen et al., Applications of cumulants to array processing. III. Blind beamforming for coherent signals, IEEE Transactions on Signal Processing, vol. 45(9), p. 2252–2264, Sep. 1997.*

C.W. Reed et al., Performance of blind beamforming algorithms, Proceedings of the Ninth IEEE SP Workshop on Statistical Signal and Array Processing, p. 256–259, Sep. 1998.*

M. Chenu–Tournier et al., Proceedings of the IEEE International Conference on Acoustics, Speech, and Signal Processing, Vo 5, p. 2873–2876, Mar. 1999.*

S.E. El–Khamy et al., On the performance of the VESPA algorithm for blind beamforming and signal detection of multi–source multipath signals, IEEE International Symposium on the Antennas and Propagation Society, vol. 2, p. 1456–1459, Jul. 1999.*

A. Ferreol et al., DOA estimation after blind identification of subspace channel vectors in multipath contexts, Proceedings of the IEEE International Conference on Acoustics, Speech, and Signal Processing, vol. 3, p. III–0361–III–3064, May 2002.*

M.C. Vanderveen, et al., "Joint Angle and Delay Estimation (JADE) for Signals in Multipath Environments", Signals, Systems, and Computers, 1996, Conference Record of the Thirtieth Asilomar Onference on Pacific Grove, CA, USA, Nov. 3–6, 1996, Los Alamitos, CA, pp. 1250–1254.

Alle–Jan Van Der Veen, et al., "SI–JADE: An Algorithm for Joint Angle and Delay Estimation Using Shift–Invariance Properties", Signal Processing Advances in Wireless Communications, First IEEE Signal Processing Workshop on Paris, France, Apr. 16–18, 1997, pp. 161–164.

(List continued on next page.)

*Primary Examiner*—Thomas H. Tarcza
*Assistant Examiner*—F H Mull
(74) *Attorney, Agent, or Firm*—Oblon, Spivak, McClelland, Maier & Neustadt, P.C.

(57) ABSTRACT

Method and device for space-time estimation of one or more transmitters based on signals received using an antenna network. Signals received using the antenna network are separated in order to obtain signals s(t). Signals s(t) are grouped by transmitter, where the signals s(t) are from more than one transmitter, and arrival angles $\theta_{mi}$ of the multipaths $p_m$ transmitted by each transmitter are determined.

16 Claims, 4 Drawing Sheets

OTHER PUBLICATIONS

Chong–Meng Samson See, et al., "Estimating Directions and Times of Arrival of Multipath Signals Using A Calibrated Space–Time Antenna Array", Statistical Signal and Array Processing, 1998, Proceedings., Ninth IEEE SP Workship on Portland, OR, Sep. 14–16, 1998, New York, NY, pp. 364–367.

Pascal Chevalier, et al., "Behaviour of Higher Order Blind Source Separation Methods in the Presence of Cyclostationary Correlated Multipaths", Higher–Order Statistics, 1997, Proceedings of the IEEE Signal Processing Workshop on Banff, Alberta, Canada, Jul. 21–23, 1997, Los Alamitos, CA, pp. 363–367.

J.F. Cardoso, et al., "Blind Beamforming for Non–Gaussian Signals", IEE Proceedings F. Communications, Radar & Signal Processing, Institutions of Electrical Engineers, Stevenage, GB, vol. 40, No. 6, Dec. 1, 1993, pp. 362–370.

* cited by examiner

METHOD AND DEVICE FOR SPACE-TIME ESTIMATION OF ONE OR MORE TRANSMITTERS

BACKGROUND OF THE INVENTION

1. Field of the Invention

This invention concerns a method for the space-time estimation of one or more transmitters in an antenna network when the wave transmitted by a transmitter is propagated as multipaths.

Multipaths exist when a wave transmitted by a transmitter is propagated along several paths towards a receiver or a goniometry system. Multipaths are due in particular to the presence of obstacles between a transmitter and a receiver.

The field of the invention concerns in particular that of the goniometry of radioelectric sources, the word source designating a transmitter. Goniometry means "the estimation of incidences".

It is also that of spatial filtering whose purpose is to synthesise an antenna in the direction of each transmitter from a network of antennas.

2. Discussion of the Background

The purpose of a traditional radiogoniometry system is to estimate the incidence of a transmitter, i.e. the angles of arrival of radioelectric waves incident on a network 1 of N sensors of a reception system 2, for example a network of several antennas as represented in FIGS. 1 and 2. The network of N sensors is coupled to a computation device 4 via N receivers in order to estimate the angles of incidence $\theta_p$ of the radioelectric waves transmitted by various sources p or transmitters and which are received by the network.

The wave transmitted by the transmitter can propagate along several paths according to a diagram given in FIG. 3. The wave $k(\theta_d)$ has a direct path with angle of incidence $\theta_d$ and the wave $k(\theta_r)$ a reflected path with angle of incidence $\theta_r$. The multipaths are due in particular to obstacles 5 located between the transmitter 6 and the reception system 7. At the reception station, the various paths arrive with various angles of incidence $\theta_{op}$ where p corresponds to the $p^{th}$ path. The multipaths follow different propagation routes and are therefore received at different times $t_{mp}$.

The N antennas of the reception system receive the signal $x_n(t)$ where n is the index of the sensor. Using these N signals $x_n(t)$, the observation vector is built:

$$\underline{x}(t) = \begin{bmatrix} x_1(t) \\ \cdot \\ \cdot \\ \cdot \\ x_n(t) \end{bmatrix} \quad (1)$$

With M transmitters this observation vector x(t) is written as follows:

$$\underline{x}(t) = \sum_{m=1}^{M} \sum_{p=1}^{P_m} \rho_{mp} \underline{a}(\theta_{mp}) s_m(t - \tau_{mp}) + \underline{b}(t) \quad (2)$$

where $a(\theta_{mp})$ is the steering vector of the $p^{th}$ path of the $m^{th}$ transmitter. The vector $a(\theta)$ is the response of the network of N sensors to a source of incidence $\theta$ $\rho_{mp}$ is the attenuation factor of the $p^{th}$ path of the $m^{th}$ transmitter $\tau_{mp}$ is the delay of the $p^{th}$ path of the $m^{th}$ transmitter $P_m$ is the number of multipaths of the $m^{th}$ transmitter $s_m(t)$ is the signal transmitted by the $m^{th}$ transmitter $b(t)$ is the noise vector composed of the additive noise $b_n(t)$ ($1 \leq n \leq N$) on each sensor.

The prior art describes various techniques of goniometry, of source separation and of goniometry after the separation of the source.

These techniques consist of estimating the signals $s_m(t-\tau_{mp})$ from the observation vector x(t) with no knowledge of their time properties. These techniques are known as blind techniques. The only assumption is that the signals $s_m(t-\tau_{mp})$ are statistically independent for a path p such that $1 \leq p \leq P_m$ and for a transmitter m such that $1 \leq m \leq M$. Knowing that the correlation between the signals $s_m(t)$ and $s_m(t-\tau)$ is equal to order 2 to the autocorrelation function $r_{sm}(\tau)=E[s_m(t)s_m(t-\tau)^*]$ of the signal $s_m(t)$, we deduce that the multipaths of a given signal $s_m(t)$ transmitter are dependent since the function $r_{sm}(\tau)$ is non null. However, two different transmitters m and m', of respective signals $s_m(t)$ and $s_{m'}(t)$, are statistically independent if the relation $E[s_m(t) s_{m'}(t)^*]=0$ is satisfied, where E[.] is the expected value. Under these conditions, these techniques can be used when the wave propagates in a single path, when $P_1= \ldots =P_M=1$. The observation vector x(t) is then expressed by:

$$\underline{x}(t) = \sum_{m=1}^{M} \underline{a}(\theta_m) s_m(t) + \underline{b}(t) = A \underline{s}(t) + \underline{b}(t) \quad (3)$$

where $A=[a(\theta_1) \ldots a(\theta_M)]$ is the matrix of steering vectors of the sources and s(t) is the source vector such that $s(t)=[s_1(t) \ldots s_M(t)]^T$ (where the exponent T designates the transpose of vector u which satisfies in this case u=s(t)).

These methods consist of building a matrix W of dimension (N×M), called separator, generating at each time t a vector y(t) of dimension M which corresponds to a diagonal matrix and, to within one permutation matrix, to an estimate of the source vector s(t) of the envelopes of the M signals of interest to the receiver. This problem of source separation can be summarised by the following expression of the required vectorial output at time t of the linear separator W:

$$y(t)=W^H x(t)=\Pi \Lambda \hat{s}(t) \quad (4)$$

where $\Pi$ and $\Lambda$ correspond respectively to arbitrary permutation and diagonal matrices of dimension M and where $\hat{s}(t)$ is an estimate of the vector s(t). $W^H$ designates the transposition and conjugation operation of the matrix W.

These methods involve the statistics of order 2 and 4 of the observation vector x(t).

Order 2 Statistics: Covariance Matrix

The correlation matrix of the signal x(t) is defined by the following expression:

$$R_{xx}=E[x(t)x(t)^H] \quad (5)$$

Knowing that the source vector s(t) is independent of the noise b(t) we deduce from (3) that:

$$R_{xx}=AR_{ss}A^H+\sigma^2 I \quad (6)$$

Where $R_{ss}=E[s(t) s(t)^H]$ and $E[b(t) b(t)^H]=\sigma^2 I$.

The estimate of $R_{xx}$ used is such that:

$$\hat{R}_{xx} = \frac{1}{T}\sum_{t=1}^{T} x(t)x(t)^H \quad (7)$$

where T corresponds to the integration period.

Order 4 Statistics: Quadricovariance

By extension of the correlation matrix, we define with order 4 the quadricovariance whose elements are the cumulants of the sensor signals $x_n(t)$:

$$Qxx(i,j,k,l) = \text{cum}\{xi(t), xj(t)^*, xk(t)^*, xl(t)\} \quad (8)$$

With $\text{cum}\{y_i, y_j, y_k, y_l\} = E[y_i\ y_j\ y_k\ y_l] - E[y_i\ y_j][y_k\ y_l]$ (9)
$$-E[y_i\ y_k][y_j\ y_l]$$
$$-E[y_i\ y_l][y_j\ y_k]$$

Knowing that N is the number of sensors, the elements $Q_{xx}(i,j,k,l)$ are stored in a matrix $Q_{xx}$ at line number $N(j-1)+i$ and column number $N(l-1)+k$. $Q_{xx}$ is therefore a matrix of dimension $N^2 \times N^2$.

It is also possible to write the quadricovariance of observations x(t) using the quadricovariances of the sources and the noise written respectively $Q_{ss}$ and $Q_{bb}$. Thus according to expression (3) we obtain:

$$Q_{xx} = \sum_{i,j,k,l} Q_{ss}(i,j,k,l)[a(\theta_i)\otimes a(\theta_j)^*][a(\theta_k)\otimes a(\theta_l)^*]^H + Q_{bb} \quad (10)$$

where $\otimes$ designates the Kronecker product such that:

$$\underline{u}\otimes\underline{v} = \begin{bmatrix} u\,v_1 \\ . \\ u\,v_K \end{bmatrix} \text{ where } \underline{v} = \begin{bmatrix} v_1 \\ . \\ v_K \end{bmatrix} \quad (11)$$

Note that when there are independent sources, the following equality (12) is obtained:

$$Q_{xx} = \sum_{m=1}^{M} Q_{ss}(m,m,m,m)\ [\underline{a}(\theta_m)\otimes\underline{a}(\theta_m)^*]\ [\underline{a}(\theta_m)\otimes\underline{a}(\theta_m)^*]^H + Q_{bb}$$

Since $Q_{ss}(i,j,k,l)=0$ for $i\neq j\neq k\neq l$. In addition, in the presence of Gaussian noise the quadricovariance $Q_{bb}$ of the noise cancels out and leads to (13):

$$Q_{xx} = \sum_{m=1}^{M} Q_{ss}(m,m,m,m)\ [\underline{a}(\theta_m)\otimes\underline{a}(\theta_m)^*]\ [\underline{a}(\theta_m)\otimes\underline{a}(\theta_m)^*]^H$$

An example of a known source separation method is the Souloumiac-Cardoso method which is described, for example, in document [1] entitled "Blind Beamforming for Non Gaussian Signals", authors J. F. CARDOSO, A. SOULOUMIAC, published in the review IEE Proc-F, Vol 140, No. 6, pp 362–370, December 1993.

FIG. 4 schematises the principle of this separation method based on the statistical independence of sources. Under these conditions, the matrices $R_{ss}$ and $Q_{ss}$ of expressions (6) and (10) are diagonal. This figure shows that the algorithm used to process the observation vector corresponding to the signals received on the sensor network is composed of a data x(t) whitening step 10 resulting in an observation vector z(t), and a steering vector identification step 11, possibly followed by a spatial filtering step 12 using the signal vector x(t) to obtain an estimated signal $\hat{s}'(t)$. The whitening step uses the covariance matrix $R_{xx}$ in order to orthonormalise the basis of the steering vectors $a(\theta_1) \ldots a(\theta_M)$. The second identification step uses the quadricovariance $Q_{zz}$ to identify the steering vectors previously orthonormalised.

The coefficients of the spatial filtering step $W_i$ are defined as follows $$w_i = aR_x^{-1}a(\theta_i)$$

Whitening Step

Whitening is carried out to orthogonalise the mixture matrix A to be estimated. The observations x(t) must be multiplied by a matrix $\Theta^{-1}$ such that the covariance matrix of denoised and whitened observations is equal to the identity matrix. z(t) represents the vector of noised and whitened observations:

$$z(t) = \Theta^{-1}x(t) = \Theta^{-1}As(t) + \Theta^{-1}b(t) \quad (14)$$

The matrix $\Theta$ of dimension $N\times M$ must then satisfy according to (6) the following relation:

$$\Theta\Theta^H = R_{xx} - R_{bb} = AR_{ss}A^H \quad (15)$$

Knowing that $E[b(t)\ b(t)^H] = \sigma^2 I$, we deduce from (6) that the decomposition into eigenelements of $R_{xx}$ satisfies:

$$R_{xx} = E_s\Lambda_s E_s^H + \sigma^2 E_b E_b^H \quad (16)$$

Where $\Lambda_s$ is a diagonal matrix of dimension $M\times M$ containing the M largest eigenvalues of $R_{xx}$. The matrix $E_s$ of dimension $N\times M$ is composed of eigenvectors associated with the largest eigenvalues of $R_{xx}$ and the matrix $E_b$ of dimension $N\times(N-M)$ is composed of eigenvectors associated with the noise eigenvalue $\sigma^2$. Knowing firstly that $R_{bb} = E[b(t)\ b(t)^H] = \sigma^2 I$ and that secondly by definition from the decomposition into eigenelements that $(E_s\ E_s^{H+E}{}_b\ E_b^H) = I$, we deduce from (15) that:

$$\Theta\Theta^H = A\ R_{ss}A^H = E_s(\Lambda_s - \sigma^2 I_M)E_s^H \quad (17)$$

We can then take for matrix $\Theta$ the following matrix of dimension $N\times M$.

$$\Theta = E_s(\Lambda_s - \sigma^2 I_M)^{1/2} \quad (18)$$

According to (17) we deduce that the matrix $\Theta$ also equals:

$$\Theta = A\ R_{ss}^{1/2}U^H \text{ with } U^H U = I_M \quad (19)$$

U is then a unit matrix whose columns are formed from orthonormed vectors. According to (3), (14) and (19) the vector z(t) of dimension $M\times 1$ can be expressed as follows:

$$z(t) = Us'(t) + \Theta^{-1}b(t) \text{ with } s'(t) = R_{ss}^{-1/2}s(t) \quad (20)$$

With decorrelated sources, the matrices $R_{ss}$ and $R_{ss}^{-1/2}$ are diagonal and so the components of vectors s'(t) and s(t) are equal to within one amplitude such that:

$$s'(t) = \begin{bmatrix} s_1(t)/\sqrt{\gamma_1} \\ . \\ s_M(t)/\sqrt{\gamma_M} \end{bmatrix} \text{ where } s(t) = \begin{bmatrix} s_1(t) \\ . \\ s_M(t) \end{bmatrix} \text{ and } R_{ss} = \begin{bmatrix} \gamma_1 & . & 0 \\ . & . & . \\ 0 & . & \gamma_M \end{bmatrix}$$

The matrix U is composed of whitened steering vectors such that:

$$U = [t_1 \ldots t_M] \quad (21)$$

Identification Step

The purpose of this step is to identify the unit matrix U composed of M whitened steering vectors $t_m$. According to (20) and (21), the vector z(t) of whitened observations can be expressed as follows:

$$z(t) = U\underline{s}'(t) + \Theta^{-1}\underline{b}(t) = \sum_{m=1}^{M} t_M s'_m(t) + \underline{b}'(t) \quad (22)$$

with $s'_m(t) = s_m(t)/\sqrt{\gamma_m}$ and $\underline{b}'(t) = \Theta^{-1}\underline{b}(t)$.

Knowing that the M signal sources $s'_m(t)$ are independent, we deduce according to (13) that the quadricovariance of z(t) can be written as follows:

$$Q_{zz} = \sum_{m=1}^{M} Q_{s's'}(m,m,m,m)[t_m \otimes t_m^*][t_m \otimes t_m^*]^H \quad (23)$$

Under these conditions, the matrix $Q_{zz}$ of dimension $M^2 \times M^2$ has rank M. Diagonalisation of $Q_{zz}$ then enables us to retrieve the eigenvectors associated with the M largest eigenvalues. These eigenvectors can be written as follows:

$$\underline{e}_m = \sum_{i=1}^{M} \alpha_{mi}(t_i \otimes t_i^*) \text{ for } m = 1 \cdots M \quad (24)$$

We then transform each vector $e_m$ of length $M^2$ into a matrix $U_m$ of dimension (M×M) whose columns are the M M-uplets forming, the vector $e_m$.

$$U_m = \begin{pmatrix} e_{m,1} & e_{m,M+1} & \cdots & e_{m,(M-1)M+1} \\ \vdots & \vdots & \vdots & \vdots \\ e_{m,M} & e_{m,2M} & \cdots & e_{m,M^2} \end{pmatrix} \quad (25)$$

with $\underline{e}_m = \begin{pmatrix} e_{m,1} \\ \vdots \\ e_{m,M} \\ \vdots \\ e_{m,(M-1)M+1} \\ \vdots \\ e_{m,M^2} \end{pmatrix}$ which according to equation (24) can also be written:

$$U_m = \sum_{i=1}^{M} \alpha_{mi} t_i t_i^H = U\delta_m U^H \quad (26)$$

where $\delta_m$ is a diagonal matrix of elements $\alpha_{mi}$. To identify the matrix U, simply diagonalise the eigenmatrices $U_m$ for $1 \leq m \leq M$ since the matrix U is a unit matrix due to the whitening step. Reference [1] proposes an algorithm for joint diagonalisation of the M matrices $U_m$.

Knowing the matrices U and Θ we can deduce according to (19) the matrix A of steering vectors such that:

$$\Theta U = A R_{ss}^{1/2} = [a'_1 \ldots a'_M] \text{ with } a'_m = a(\theta_m) \times \sqrt{\gamma_m} \quad (27)$$

We therefore identify the steering vectors $a(\theta_m)$ of the sources to within a multiplying factor $\sqrt{\gamma_m}$. According to expressions (20) and (14) and knowing the matrices U and Θ we deduce the estimate of the source vector s'(t) such that:

$$\hat{\underline{s}}'(t) = U^H \Theta^{-1}\underline{x}(t)$$

$$\text{where } \hat{\underline{s}}'(t) = \begin{bmatrix} \hat{s}_1(t)/\sqrt{\gamma_1} \\ \vdots \\ \hat{s}_M(t)/\sqrt{\gamma_M} \end{bmatrix}$$

knowing that $$R_{ss} = \begin{bmatrix} \gamma_1 & \cdots & 0 \\ \vdots & \vdots & \vdots \\ 0 & \cdots & \gamma_M \end{bmatrix} \quad (28)$$

We therefore estimate the signals $s_m(t)$ to within a multiplying factor of value $(1/\sqrt{\gamma_m})$ such that:

$$\hat{s}'_m(t) = (1/\sqrt{\gamma_m})\hat{s}_m(t) \quad (29)$$

Behaviour with Multipaths

Knowing that, for a given transmitter m, the signals $s_m(t)$ and $s_m(t-\tau)$ are correlated, it is possible to deduce the existence of dependence between the signal multipaths $s_m(t-\tau_{mp})$ with $1 < p < P_m$.

It was demonstrated in reference [2], authors P. CHEVALIER, V. CAPDEVIELLE, P. COMON, entitled "Behaviour of HO blind source separation methods in the presence of cyclostationary correlated multipaths", published in the IEEE review SP Workshop on HOS, Alberta (Canada), July 1997, that the source separation method separates the transmitters without separating their multipaths. So by taking the signal model of expression (2) for the $m^{th}$ transmitter we identify the following $P_m$ vectors:

$$\underline{u}_{mp} = \sum_{i=1}^{P_m} \beta_{mpi} \underline{a}(\theta_{mi}) \text{ for } 1 \leq p \leq P_m \quad (30)$$

Similarly for the $m^{th}$ transmitter we identify the following $P_m$ signals:

$$\hat{s}'_{mp}(t) = \sum_{i=1}^{P_m} \beta'_{mpi} \hat{s}_m(t-\tau_{mi}) \text{ for } 1 \leq p \leq P_m \quad (31)$$

These source separation techniques assume, in order to be efficient, that the signals propagate in a single path. The signals transmitted by each transmitter are considered as statistically independent.

With a single path where $P_1 = \ldots = P_m = 1$, the sources are all independent and the M vectors identified at separation output have, according to the relation (27), the following structure:

$$a'_m = \beta_m a(\theta_m) \text{ for } 1 \leq m \leq M \quad (32)$$

For each transmitter, the following noise projector $\Pi_{bm}$ is built:

$$\prod_{bm} = I_N - \frac{a'_m a'^H_m}{a'^H_m a'_m} \text{ for } 1 \le m \le M \quad (33)$$

By applying the MUSIC principle we then look for the incidence $\hat{\theta}_m$ of the $m^{th}$ transmitter which cancels the following criterion:

$$\hat{\theta}_m = \min_\theta \left\{ \underline{a}(\theta)^H \prod_{bm} \underline{a}(\theta) \right\} \text{ for } 1 \le m \le M \quad (34)$$

The principle of the MUSIC algorithm is for example described in document [3] by R. O. Schmidt entitled "A signal subspace approach to multiple emitters location and spectral estimation", PhD Thesis, Stanford University, CA, November 1981.

Thus, using vectors $a'_1 \ldots a'_M$ identified at source separation output it is possible to deduce the incidences $\hat{\theta}_1 \ldots \hat{\theta}_M$ for each transmitter. However, the sources must be decorrelated if the vectors identified are to satisfy the relation $a'_m = \beta_m$ a $(\theta_m)$.

For example, in document [4] entitled "Direction finding after blind identification of sources steering vectors: The Blind-Maxcor and Blind-MUSIC methods", authors P. CHEVALIER, G. BENOIT, A. FERREOL, and published in the review Proc. EUSIPCO, Triestre, September 1996, a blind-MUSIC algorithm of the same family as the MUSIC algorithm, known by those skilled in the art, is applied.

The known techniques of the prior art can therefore be used to determine the incidences for the various transmitters if the wave transmitted for each of these transmitters propagates as monopath.

The invention concerns a method and a device which can be used to determine in particular, for each transmitter propagating as multipaths, the incidences of the arrival angles for the multipaths.

SUMMARY OF THE INVENTION

The purpose of this invention is to carry out selective goniometry by transmitter in the presence of multipaths, i.e. for $P_m > 1$.

One of the methods implemented by the invention is to group the signals received for each transmitter, before carrying out the goniometry of all these multipaths for each transmitter, for example.

Another method consists of space-time separation of the sources or transmitters.

In this description, the following terms are defined:

Ambiguities: we have an ambiguity when the goniometry algorithm can estimate with equal probability either the true incidence of the source or another quite different incidence. The greater the number of sources to be identified simultaneously, the greater the risk of ambiguity.

Multipath: when the wave transmitted by a transmitter propagates along several paths towards the goniometry system. Multipaths are due to the presence of obstacles between a transmitter and a receiver.

Blind: with no a priori knowledge of the transmitting sources.

The invention concerns a method for space-time estimation of the angles of incidence of one or more transmitters in an antenna network wherein it comprises at least a step to separate the transmitters and a step to determine the various arrival angles $\theta_{mi}$ of the multipaths p transmitted by each transmitter.

According to a first mode of realisation, the method comprises at least a step to separate the transmitters in order to obtain the various signals s(t) received by the antenna network, a step to group the various signals by transmitter and a step to determine the various angles $\theta_{mi}$ of the multipaths by transmitter.

The step to group the various signals by transmitter comprises for example:

a step to intercorrelate two by two the components $u_k(t)$ of the signal vector s'(t) resulting from the source separation step, a step to find the delay value(s) in order to obtain a maximum value for the intercorrelation function, $r_{kk'}(\tau) = E[u_k(t)u_{k'}(t-\tau)^*]$, a step to store the various path indices for which the correlation function is a maximum.

The method comprises for example a step to determine delay times using the incidences $\theta_{mi}$, the signal $s_m(t)$ and the search for the maximum of the criterion $\text{Cri}_i(\delta\tau)$ to obtain $\delta\tau_{mi} = \tau_{mi} - \tau_{ml}$, with $\text{Cri}_i(\delta\tau) = E[s_m(t)(i)s_m(t-\delta\tau)(1)^*]$.

According to a second realisation variant, the method comprises a step of space-time separation of the various transmitters before determining the various arrival angles $\theta_{mi}$.

The space-time separation step comprises for example a step where, for a given transmitter, the signal $s_m(t)$ is delayed, thereby comparing the delayed signal to the output of a filter of length $L_m$, whose inputs are $s_m(t)$ up to $s_m(t-\tau_m)$, before applying the source separation.

The method may comprise a step to identify and eliminate the outputs associated with the same transmitter after having determined the angles $\theta_{mi}$.

The method implements, for example, different types of goniometry, such as high resolution methods such as in particular MUSIC, interferometry methods, etc.

The method applies to the goniometry of multipath sources and also when $P_1 = \ldots = P_m = 1$.

The invention also concerns a device to make a space-time estimation of a set of transmitters which transmit waves propagating as multipaths in a network of N sensors wherein it comprises a computer designed to implement the steps of the method characterised by the steps described above.

The method according to the invention can be used in particular to carry out separate goniometry of the transmitters. Thus, only the incidences of the multipaths of a given transmitter are determined.

Under these conditions, compared with a traditional technique which must simultaneously locate all the transmitters with their multipaths, the method can be used to perform goniometry on fewer sources.

BRIEF DESCRIPTION OF THE DRAWINGS

Other advantages and features of the invention will be clearer on reading the following description given as a non-limiting example, with reference to figures representing in.

DESCRIPTION OF THE PREFERRED EMBODIMENTS

Figure 1:
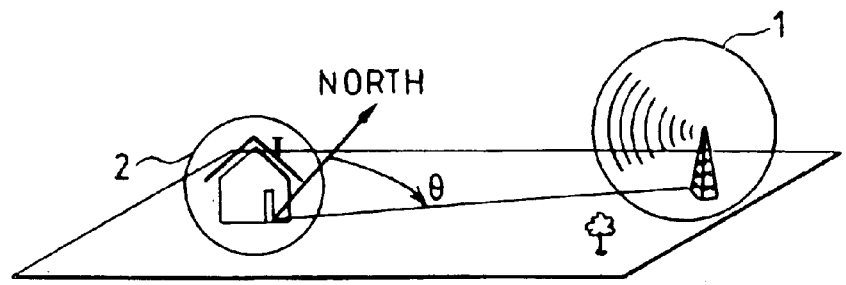
FIG. 1 a transmission-reception system, and in FIG. 2 a network of N sensors.
Figure 2:
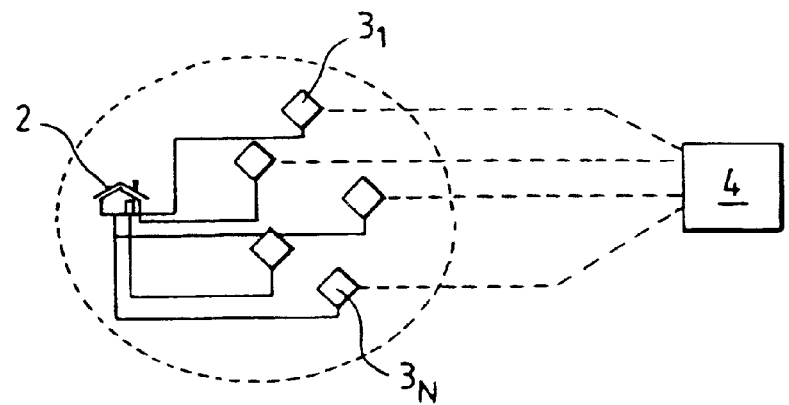
Figure 3:
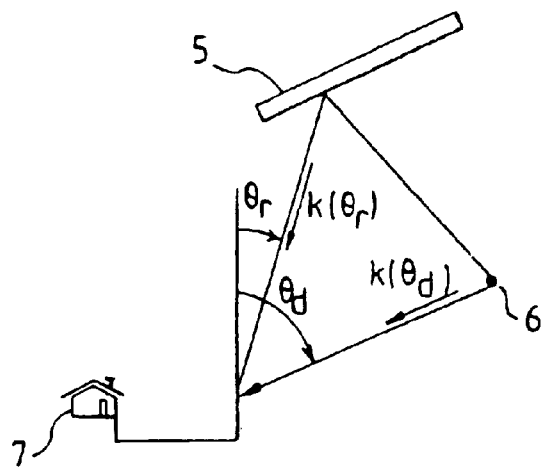
FIG. 3 the possible paths of waves transmitted by a transmitter.
Figure 4:
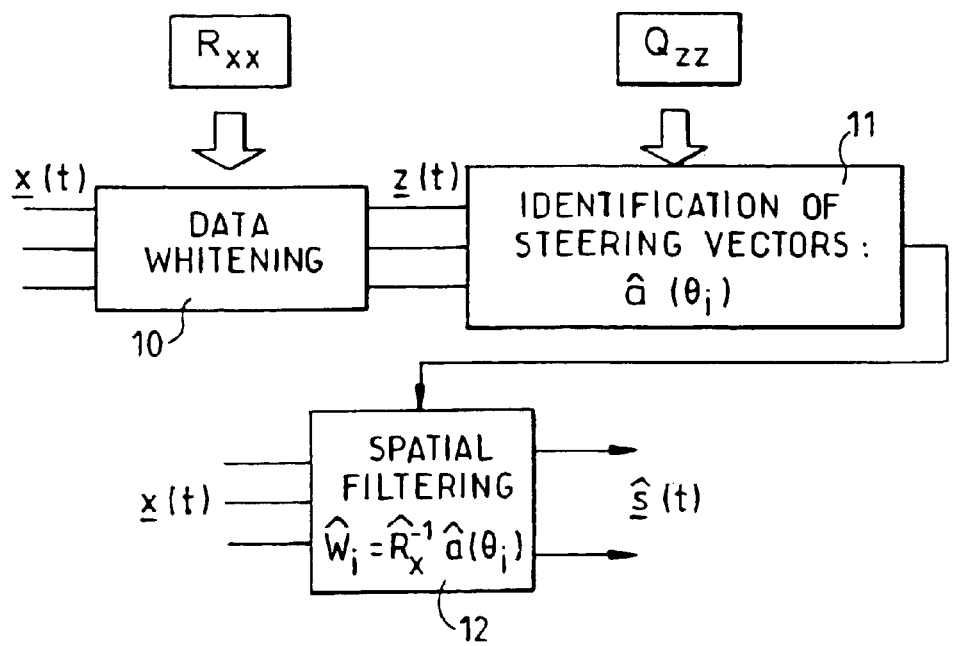
FIG. 4 a source separation method according to the prior art.

The acquisition system described in FIG. 2 includes a network 2 composed of N antennas $3_1$ to $3_N$ linked to a computer 4 designed in particular to implement the various steps of the method according to the invention. The computer is for example adapted to determine the arrival angles for each transmitter 1i (FIG. 1) transmitting a wave which can propagate as multipaths as shown on the diagram in FIG. 1. The computer is equipped with means to perform the goniometry of each transmitter 1i.

The sensors or antennas of the receiver system receive signals $x_n(t)$ as described previously, so that the observation vector $x(t)$ can be built using the N antennas.

Remember that when there are multipaths, we identify for the $m^{th}$ transmitter, $P_m$ paths for the propagation of the transmitted wave and the following $P_m$ vectors:

$$u_{mp} = \sum_{i=1}^{P_m} \beta_{mpi} a(\theta_{mi}) \text{ for } 1 \leq p \leq P_m$$

where $a(\theta_{mi})$ is the steering vector of the $i^{th}$ path of the $m^{th}$ transmitter.

Similarly for this $m^{th}$ transmitter we identify the following $P_m$ signals:

$$\hat{s}'_{mp}(t) = \sum_{i=1}^{P_m} \beta'_{mpi} \hat{s}_m(t - \tau_{mi}) \text{ for } 1 \leq p \leq P_m$$

Also, for paths $p \neq p'$, the signals $\hat{s}'_{mp}(t)$ and $\hat{s}'_{mp'}(t)$ output from a separation step are independent since they satisfy:

$$E[\hat{s}'_{mp}(t)\hat{s}'_{mp'}(t)^*]=0.$$

The idea of the method according to the invention is to carry out separate goniometry of the transmitters when the wave or waves propagate as multipaths, either by grouping the various outputs by transmitter, or by introducing a space-time source separation step before performing the goniometry for each transmitter.

Method Associating the Source Separation Outputs by Transmitter

Figure 5:
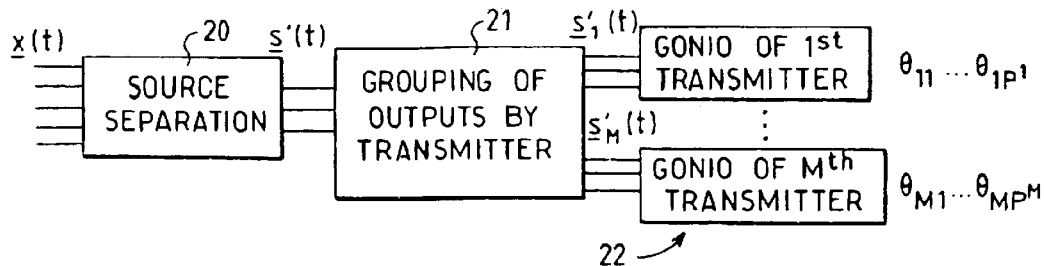
FIG. 5 a diagram of the various steps of a first method according to the invention of source association and in FIG. 6 the associated processing algorithm, FIG. 7 a second variant with space-time source separation, FIG. 8 an example of the spectrum obtained.

According to a first implementation of the method described in FIG. 5, the invention consists of detecting the outputs $\hat{s}'_{mp}(t)$ issued from the separation step 20, of grouping 21 the outputs belonging to the same transmitter and of performing for example a goniometry step 22 on each output, for a given transmitter.

The method includes for example the following steps:

a) Separate, 20, the sources according to a separation method known by Professionals and applied to the observation vector $x(t)$ received by the antenna network. After this separation step, the method has obtained a vector $s'(t)$ of components $\hat{s}'_{mp}(t)$ representative of the various paths transmitted by the $m^{th}$ transmitter, b) Group the outputs by transmitter, 21, c) Correlate two by two the components of the vector $s'(t)$ resulting from the source separation step, d) Search for the value of the delay time $\tau_{mp}$ to obtain a maximum value of the intercorrelated signals, and store the corresponding paths, for example in a table.

e) Perform a goniometry step, 22, for each transmitter to obtain the angles $\theta_{mPm}$ Following the separation step a), the vector $s'(t)$ of component $\hat{s}'_{mp}(t)$ can be written as follows:

$$\hat{s}'(t) = \begin{bmatrix} u_1(t) \\ \vdots \\ u_K(t) \end{bmatrix} \text{ where } K = \sum_{m=1}^{M} P_m \text{ and } u_k(t) = \hat{s}'_{mp}(t) \quad (35)$$

According to expression (31), the function $r_{kk'}(\tau)$ of intercorrelation between the signals $u_k(t)$ and $u_{k'}(t)$ is non null when they are associated with the same transmitter.

$$r_{kk'}(\tau) = E[u_k(t)u_{k'}(t-\tau)^*] \neq 0 \text{ for } \tau > 0 \text{ and } k \neq k' \quad (36)$$

The signals $u_k(t)$ and $u_{k'}(t)$ are in fact different linear combinations of the signals $\hat{s}_m(t-\tau_{mp})$ for $(1 \leq p \leq P_m)$. Knowing that after filtering these two signals are noised respectively by $b_k(t)$ et $b_{k'}(t)$, we obtain:

$$u_k(t) = \sum_{i=1}^{P_m} \beta'_{ki} \hat{s}_m(t - \tau_{mi}) + b_k(t)$$

$$u_{k'}(t - \tau) = \sum_{i=1}^{P_m} \beta'_{k'i} \hat{s}_m(t - \tau_{mi} - \tau) + b_{k'}(t)$$

The method comprises for example a step to search for the delay value which maximises the intercorrelation between the outputs $u_k(t)$ and $u_{k'}(t-\tau)$ and a step to store the indices k and k' when the maximum exceeds a threshold.

To test the correlation between $u_k(t)$ and $u_{k'}(t-\tau)$, a Gardner type detection test can be applied, such as that described in the document entitled "Detection of the number of cyclostationary signals in unknons interference and noise", authors S V. Schell and W. Gardner, published in Proc of Asilonan conf on signal, systems and computers 5–7 November 90.

To do this, the following detection criterion can be calculated:

$$V_{kk'}(\tau) = -2T \ln\left(1 - \frac{|\hat{r}_{kk'}|^2}{\hat{r}_{kk}\hat{r}_{k'k'}}\right) \quad (37)$$

with $\hat{r}_{kk'} = \frac{1}{T}\sum_{t=1}^{T} u_k(t)u_{k'}(t-\tau)^*$ and $\hat{r}_{kk} = \frac{1}{T}\sum_{t=1}^{T} |u_k(t)|^2$ then $\hat{r}_{k'k'} = \frac{1}{T}\sum_{t=1}^{T} |u_{k'}(t-\tau)|^2$ Knowing that in the assumption where $u_k(t)=b_k(t)$ and $u_{k'}(t)=b_{k'}(t)$ the criterion $V_{kk'}(\tau)$ obeys a chi-2 law with 2 degrees of freedom, we deduce the correlation test by defining a threshold $\alpha(pfa)$:

The signals $u_k(t)$ and $u_{k'}(t)$ are correlated ($H_1$): $V_{kk'}(\tau) > \alpha$ (pfa)

The signals $u_k(t)$ and $u_{k'}(t)$ are decorrelated ($H_0$): $V_{kk'}(\tau) < \alpha(pfa)$ Knowing the probability law of the criterion $V_{kk'}(\tau)$ with noise only assumption, we then choose the threshold $\alpha(pfa)$ in a chi-2 table for a probability of exceeding a given threshold, with 2 degrees of freedom.

Figure 6:
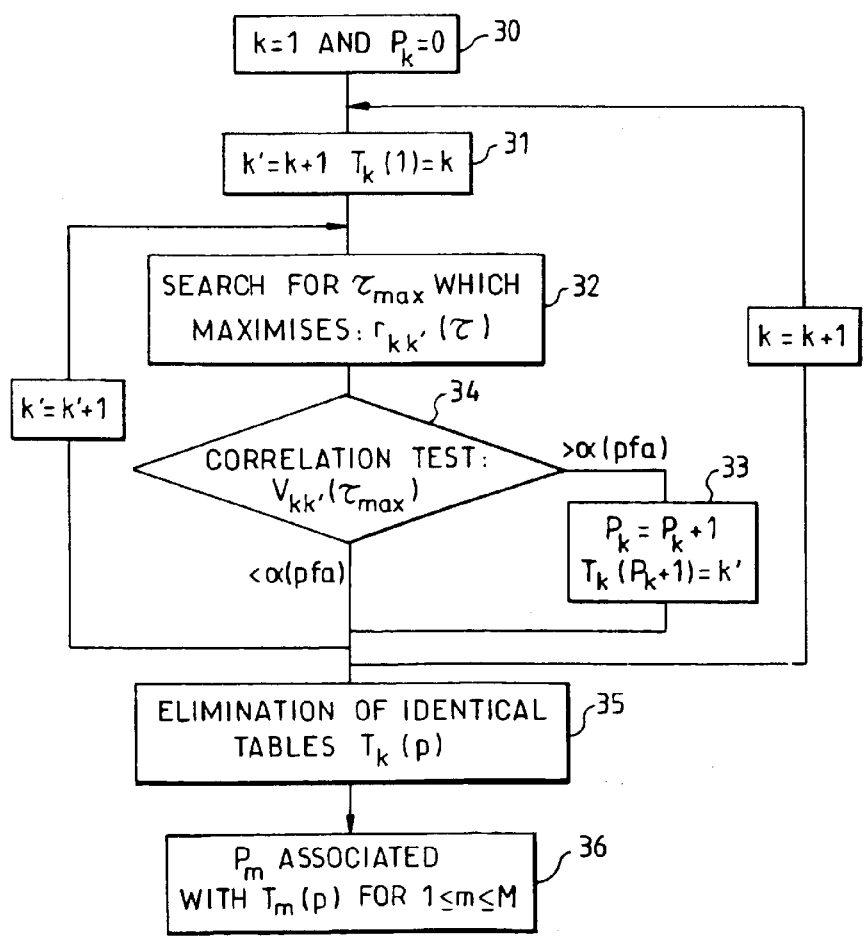

FIG. 6 summarises an example of implementing the grouping technique including the correlation test.

For a transmitter of given index m, the computer searches for the delay values τ for which the energy received by the antenna network is a maximum, by making a two by two intercorrelation of the signals resulting from the separation of sources 30, 31, 32, function $r_{kk}(\tau)$. It stores the chosen paths, maximising the intercorrelation function, in a table Tk containing the indices of the chosen paths and the indices of the transmitters, 33, by using the above-mentioned correlation test and the threshold α(pfa), 34. Then the method eliminates the identical tables Tk, for example by simple comparison 35. The computer then determines the table Tm(p), 36, composed of the source separation output indices associated with the same transmitter. Following these steps, the computer can perform goniometry for each transmitter.

Following these steps, the computer determines the number M of transmitters and the number of paths Pm for each transmitter. The table Tm obtained contains the source separation output indices associated with the same transmitter.

Goniometry

Knowing the paths for each transmitter, the computer carries out, for example, a goniometry for each transmitter as described below.

For a transmitter composed of $P_m$ paths we know, according to expression (30), that the $P_m$ vectors identified further to source separation are all a linear combination of steering vectors $a(\theta_{mi})$ of its multipaths.

$$u_k = \sum_{i=1}^{P_m} \beta_{ki} a(\theta_{mi}) \text{ for } 1 \leq p \leq P_m \text{ knowing that } T_m(p) = k$$

The table $T_m(p)$ is composed of the source separation output indices associated with the same transmitter. With the $P_m$ outputs $u_k$ we therefore calculate the following covariance matrix:

$$R_{xm} = \frac{1}{P_m} \sum_{p=1}^{P_m} u_{Tm(p)} u_{Tm(p)}^H \quad (38)$$

To estimate the incidences of the multipaths $\theta_{m1}$ up to $\theta_{mPm}$, simply apply any goniometry algorithm on the covariance matrix $R_{xm}$. In particular, we can apply a high resolution algorithm such as MUSIC described in reference [3]. Note that the blind-MUSIC algorithm of reference [4] is a special case of the latter algorithm when MUSIC is applied with $P_m=1$.

Estimation of the Delay Times of the Paths of the $m^{th}$ Transmitter

According to an implementation variant of the invention, the method estimates the values of the delay times of the paths of the $m^{th}$ transmitter.

In this paragraph, the incidences $\theta_{mi}$ of the $P_m$ paths are assumed known for $1<i<P_m$, and the associated steering vectors $a(\theta_{mi})$ deduced from these values. This information is used by the method to deduce the propagation delays between the various paths. We know that the vectors $u_{mi}$ and the signals $\hat{s}'_{mp}(t)$ obtained at source separation output satisfy the following relation:

$$\sum_{i=1}^{P_m} \rho_{mi} a(\theta_{mi}) s_m(t - \tau_{mi}) = \sum_{i=1}^{P_m} u_{mi} \hat{s}'_{mi}(t) \quad (40)$$

where $\rho_{mi}$ designates the attenuation factor of the $i^{th}$ path. Expression (40) can be written in matrix form as follows:

$$A_m s_m(t) = U_m \hat{s}'_m(t) \quad (41)$$

By putting: $A_m=[a(\theta_{m1}) \ldots a(\theta_{mPm})]$ and $U_m=[u_{m1} \ldots u_{mPm}]$ and $$s_m(t) = \begin{bmatrix} \rho_{m1} s_m(t - \tau_{m1}) \\ \vdots \\ \rho_{mPm} s_m(t - \tau_{mPm}) \end{bmatrix} \text{ then } \hat{s}'_m(t) = \begin{bmatrix} \hat{s}_{m1}(t) \\ \vdots \\ \hat{s}_{mPm}(t) \end{bmatrix}$$

Knowing the matrix $A_m$ of steering vectors of the multipaths and the matrix $U_m$ of vectors identified, we deduce the vector $s_m(t)$ according to the vector $\hat{s}'_m(t)$ resulting from the source separation such that:

$$s_m(t) = A_m^{-1} U_m \hat{s}'_m(t) \quad (42)$$

Knowing that the $i^{th}$ component of $s_m(t)$ satisfies $s_m(t)(i) = \rho_{mi} s_m(t-\tau_{mi})$ we maximise the following criterion to estimate the delay $\delta\tau_{mi}=\tau_{mi}-\tau_{m1}$ of the $i^{th}$ path with respect to the $1^{st}$ path.

$$Cri_i(\delta\tau) = E[s_m(t)(i) s_m(t - \delta\tau)(1)^*] \text{ such that } \max_{\delta\tau}\left(Cri\left(\delta\tau\right)\right) = \delta\tau_{mi} \quad (43)$$

The algorithm to estimate the $\delta\tau_{mi}$ for $1i<P_m$ consists of performing the following steps:

Step No. 1: Construct $A_m=[a(\theta_{m1}) \ldots a(\theta_{mPm})]$ from incidences $\theta_{mi}$.

Step No. 2: Calculate the signal $s_m(t)$ using the expression (42).

Step No. 3: For each path perform the following operations

Calculate the criterion $Cri_i(\delta\tau)$ of expression (43)

Maximise the criterion $Cri_i(\delta\tau)$ to obtain $\delta\tau_{mi}=\tau_{mi}-\tau_{m1}$.

Space-Time Source Separation

A second method to implement the invention consists for example of applying the source separation on the space-time observation $y(t)=[x(t)^T \ldots x(t-L+1)^T]^T$.

Figure 7:
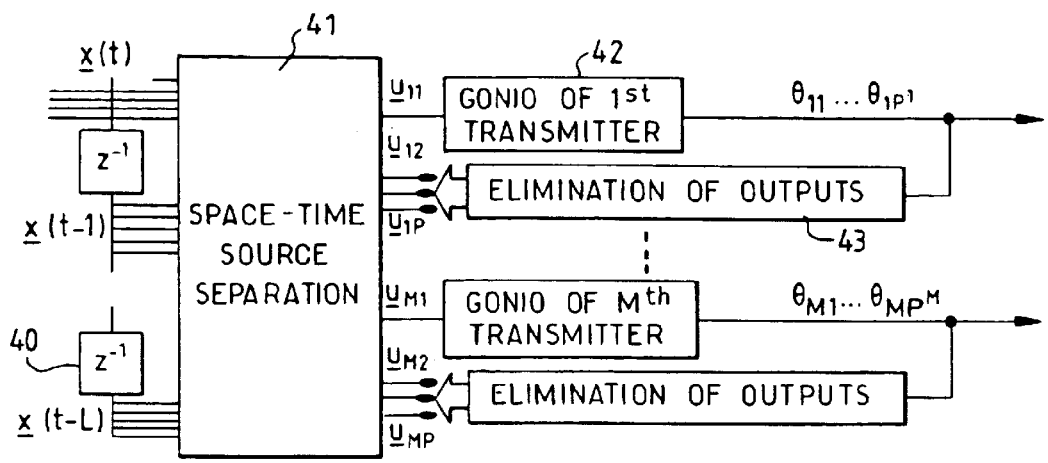

FIG. 7 represents an example of a diagram to execute the steps of the method.

By using the space-time observation, it is possible to apply directly, on each source separation output, a goniometry of the multipaths of one of the transmitters. Since one transmitter is associated with several outputs, the method includes a step to eliminate the outputs associated with the transmitter on which the goniometry process has just been carried out.

This second realisation variant can be used in particular to locate more sources than with the first method. According to this second variant in fact, the limiting parameter is the number of transmitters (M<N) whereas previously, the limiting parameter is the total number of multipaths, i.e. $\Sigma P_m < N$.

In this second implementation variant, the signal model used is that of expression (2). Firstly, the method includes a step 40 to model the signals $s_m(t)$ by considering them as finite pulse response signals of length $L_m$. Under these conditions, the delayed signal $s_m(t-\tau_{mp})$ is the output of a filter of length $L_m$, whose inputs are $s_m(t)$ up to $s_m(t-L_m+1)$, i.e.:

$$s_m(t-\tau_{mp}) = \sum_{k=1}^{L_m} h_{mp}(k) s_m(t-k+1) \qquad (44)$$

By taking expression (2) again, we obtain the following expression for x(t):

$$\underline{x}(t) = \sum_{m=1}^{M} \sum_{k=1}^{L_m} \underline{h}_m(k) s_m(t-k) + \underline{b}(t) \qquad (45)$$

with $\underline{h}_m(k) = \sum_{p=1}^{P_m} \rho_{mp} \underline{a}(\theta_{mp}) h_{mp}(k)$ The space-time observation y(t) associated with x(t) can be written as follows (46):

$$\underline{y}(t) = \begin{bmatrix} \underline{x}(t) \\ \vdots \\ \underline{x}(t-L+1) \end{bmatrix} = \sum_{m=1}^{M} \sum_{k=1}^{L_m+L} \underline{h}_m^L(k) s_m(t-k) + \underline{b}^L(t)$$

with $\underline{b}^L(t) = \begin{bmatrix} \underline{b}(t) \\ \vdots \\ \underline{b}(t-L+1) \end{bmatrix}$ Knowing that:

$$\underline{x}(t-l) = \sum_{m=1}^{M} \sum_{k=1+l}^{L_m+l} \underline{h}_m(k-l) s_m(t-k) + \underline{b}(t)$$

Ignoring the edge effects, we deduce that:

$$\underline{h}_m^L(k) = \begin{bmatrix} \underline{h}_m(k) \\ \vdots \\ \underline{h}(k-L+1) \end{bmatrix} = \sum_{p=1}^{P_m} \rho_{mp} \begin{bmatrix} \underline{a}(\theta_{mp}) h_{mp}(k) \\ \vdots \\ \underline{a}(\theta_{mp}) h_{mp}(k-L+1) \end{bmatrix} \qquad (47)$$

Source Separation and Goniometry on the Space-Time Observation y(t):

The method, for example, implements directly, 41, the Souloumiac-Cardoso source separation method described in the afore-mentioned reference [1] on the observation vector y(t). Knowing that the signals $s_m(t-k)$ are correlated, according to equations (46), (30) and reference [2], the method identifies for each transmitter several space-time signatures $u_{mk}$ satisfying:

$$\underline{u}_{mk} = \sum_{i=1}^{L_m+L} \beta_{mki} \underline{h}_m^L(i) = \sum_{p=1}^{P_m} \rho_{mp} \sum_{i=1}^{L_m+L} \beta_{mki} \begin{bmatrix} \underline{a}(\theta_{mp}) h_{mp}(i) \\ \vdots \\ \underline{a}(\theta_{mp}) h_{mp}(i-L+1) \end{bmatrix} \quad 1 \leq k \leq K \qquad (48)$$

Thus, for a transmitter with a pulse response of length $L_m$ we identify for this transmitter at source separation output [1] K vectors which are a linear combination of vectors $[a(\theta_{mp})^T h_{mp}(i) \ldots a(\theta_{mp})^T h_{mp}(i-L+1)]T$ dependent on the incidences $\theta_{mp}$ of the multipath of this transmitter.

Goniometry of the $m^{th}$ Transmitter on the Vector $u_{mk}$, 42,

The method then carries out, 42, a goniometry of a transmitter on one of the vectors $u_{m1} \ldots u_{mk}$ identified at source separation output. Under these conditions the vector $u_{mk}$ is transformed into the following matrix (49):

$$\underline{U}_{mk} = \begin{bmatrix} u_1 \\ \vdots \\ u_N \\ \vdots \\ u_{1+N(L-1)} \\ \vdots \\ u_{N+N(L-1)} \end{bmatrix} \Rightarrow U_{mk} = \begin{bmatrix} u_1 & u_{1+N(L-1)} \\ \vdots & \vdots & \vdots \\ u_N & u_{N+N(L-1)} \end{bmatrix}$$

According to the relation (48) $U_{mk}$ is expressed by:

$$U_{mk} = \sum_{p=1}^{P_m} \rho_{mp} a(\theta_{mp}) \sum_{i=1}^{L_m+L} \beta_{mki} t_{mp}^L(i)^T \text{ such that } t_{mp}^L(i) = \begin{bmatrix} h_{mp}(i) \\ \vdots \\ h_{mp}(i-L+1) \end{bmatrix} \qquad (50)$$

The computer can then estimate the incidences $\theta_{m1} \ldots \theta_{mPm}$ of the paths of the $m^{th}$ transmitter by applying a goniometry algorithm on the covariance matrix $R_{mk} = U_{mk} U_{mk}^\dagger$, for example a high resolution algorithm such as MUSIC described in reference [3], authors R. O. Schmidt, entitled "A signal subspace approach to multiple emitters location and spatial estimation", PhD Thesis, Stanford University, CA, November 1991.

Identification and Elimination of Outputs $u_{mk}$ (1<k<K) Associated with the Same Transmitter, 43, After performing the goniometry on the vector $u_{mk}$, the computer will eliminate the vectors associated with the same transmitter i.e. the $u_{mj}$ for $j \neq k$. The matrices $U_{m'j}$ associated with the $u_{m'j}$ all satisfy the following relation according to (50):

$$U_{m'j} = A_m B_{m'j}^T \text{ with } A_{m'} = [a(\theta_{m'1}) \ldots a(\theta_{m'Pm'})] \qquad (51)$$

$$B_{m'j} = [\underline{b}_{1j} \ldots \underline{b}_{Pm'j}] \quad \underline{b}_{pj} = \rho_{m'p} \sum_{i=1}^{L_m+L} \beta_{m'ji} t_{m'p}^L(i)$$

Knowing that the projector $\Pi_m = I - A_m (A_m^H A_m)^{-1} A_m^H$ satisfies $\Pi_m A_m = 0$ we deduce that (52):

$\text{Cri}(j) = \text{trace}\{\Pi_m U_{m'j} (U_{m'j}^H U_{m'j})^{-1} U_{m'j}^H \Pi_m\} = \text{trace}\{\Pi_m P_{m'j} \Pi_m\} = 0$ when m=m'

Where trace{Mat} designates the trace of the matrix Mat. For any matrix $U_{m'j}$, the criterion Cri(j) is normalised between 0 and 1. When the matrix $U_{mj}$ is associated with a vector $u_{mj}$ associated with the same transmitter as $u_{mk}$ this criterion Cri(j) is cancelled. Knowing that $\Pi_m$ and $U_{mj}$ are estimated with a certain accuracy, we will compare Cri(j) with a threshold cc close to zero (typically 0.1) to decide whether the vectors $u_{mk}$ and $u_{m'j}$ belong to the same transmitter: Cri(j)<$\alpha$ implies that $u_{mk}$ and $u_{m'j}$ are associated with the same transmitter and that m'=m. So to identify that a vector $u_{m'j}$ is associated with the same transmitter as the vector $u_{mk}$ the computer performs the following operations:

1) After the goniometry on $u_{mk}$ the computer determines the incidences $\theta_{m1} \ldots \theta_{mPm}$ of the paths and builds the matrix $A_m$ of the expression (51). We deduce that $\Pi_m = I - A_m (A_m^H A_m)^{-1} A_m^H$.

2) it transforms according to relation (49) the vector $u_{m'j}$ into matrix $U_{m'j}$. We deduce that $P_{m'j}=U_{m'j}(U_{m'j}^H U_{m'j})^{-1}U_{m'j}^H$.
3) it calculates the criterion $Cri(j)=\text{trace}\{\Pi_m P_{m'j} \Pi_m\}$ of the equation (52)
4) it applies for example the following association test:
$Cri(j)<\alpha \Rightarrow$ $u_{mk}$ and $u_{m'j}$ are associated with the same transmitter m'=m and elimination of vector $u_{mj}$.
$Cri(j)>\alpha \Rightarrow$ m'≠m.

This operation is carried out on all different vectors of $u_{mk}$, then the computer moves to the next transmitter, carrying out the goniometry step on one of the vectors $u_{m'j}$ not eliminated. After the goniometry, the method repeats the elimination and all these operations continue until there are no more vectors $u_{m'j}$.

Estimation of the Delay Times of the Paths of the $m^{th}$ Transmitter

According to an implementation variant of the method, the incidences $\theta_{mi}$ of the $P_m$ paths are known for $1<i<P_m$ and the associated steering vectors $a(\theta_{mi})$ can be deduced. This information is used to deduce the propagation delays between the paths. To obtain the path delay values, the computer uses the outputs of the space-time source separation. According to expression (2) we may write the expression (46) of y(t) as follows:

$$\underline{y}(t) = \begin{bmatrix} \underline{x}(t) \\ \vdots \\ \underline{x}(t-L+1) \end{bmatrix} = \sum_{m=1}^{M}\sum_{i=1}^{P_m}\rho_{mi}\begin{bmatrix} \underline{a}(\theta_{mi})s_m(t-\tau_{mi}) \\ \vdots \\ \underline{a}(\theta_{mi})s_m(t-L+1-\tau_{mi}) \end{bmatrix} + \underline{b}^L(t) \quad (53)$$

We therefore deduce that the vectors $u_{mk}$ according to expression (48) and the signals $\hat{s}'_{mk}(t)$ obtained at source separation output and associated with the $m^{th}$ transmitter satisfy the following relation:

$$\sum_{i=1}^{P_m}\rho_{mi}\begin{bmatrix} \underline{a}(\theta_{mi})s_m(t-\tau_{mi}) \\ \vdots \\ \underline{a}(\theta_{mi})s_m(t-L+1-\tau_{mi}) \end{bmatrix} = \sum_{k=1}^{K}\underline{u}_{mk}\hat{s}'_{mk}(t) \quad (54)$$

where $\rho_{mi}$ designates the attenuation factor of the $i^{th}$ path. Knowing that $u_{mk}^0$ corresponds to the first N components of $u_{mk}$ we deduce that:

$$\sum_{i=1}^{P_m}\rho_{mi}\underline{a}(\theta_{mi})s_m(t-\tau_{mi}) = \sum_{k=1}^{K}\underline{u}_{mk}^0 \cdot \hat{s}'_{mk}(t) \quad (55)$$

Expression (55) can be written in matrix form as follows:

$$A_m s_m(t)=U_m^0 \hat{s}'_m(t) \quad (56)$$

By putting: $A_m=[a(\theta_{m1})\ldots a(\theta_{mPm})]$ and $U_m^0=[u_m^0 \ldots u_{mK}^0]$ and $$s_m(t) = \begin{bmatrix} \rho_{m1}s_m(t-\tau_{m1}) \\ \cdot \\ \rho_{mPm}s_m(t-\tau_{mPm}) \end{bmatrix} \text{ then } \hat{s}'_m(t) = \begin{bmatrix} \hat{s}_{m1}(t) \\ \cdot \\ \hat{s}_{mK}(t) \end{bmatrix}$$

Knowing the matrix $A_m$ of steering vectors of the multipaths and the matrix $U_m^0$ of vectors identified, we deduce the vector $s_m(t)$ according to the vector $\hat{s}'_m(t)$ resulting from the space-time source separation such that:

$$s_m(t)=A_m^{-1}U_m^0\hat{s}'_m(t) \quad (57)$$

Knowing that the $i^{th}$ component of $s_m(t)$ satisfies $s_m(t)(i)=\rho_{mi}s_m(t-\tau_{mi})$ we maximise the following criterion to estimate the delay $\delta\tau_{mi}=\tau_{mi}-\tau_{m1}$ of the $i^{th}$ path with respect to the $1^{st}$ path.

$$Cri_i(\delta\tau) = E[s_m(t)(i)s_m(t-\delta\tau)(1)^*] \text{ such that } \max_{\delta\tau}\left(Cri\left(\delta\tau\right)\right) = \delta\tau_{mi} \quad (58)$$

The method then executes the algorithm to estimate the $\delta\tau_{mi}$ for $1<i<P_m$ consisting for example of performing the following steps:

Step No. 1: Construct $A_m=[a(\theta_{m1})\ldots a(\theta_{mPm})]$ from incidences $\theta_{mi}$.

Step No. 2: Calculate the signal $s_m(t)$ using the expression (57).

Step No. 3: For each path perform the following operations.

Calculate the criterion $Cri_i(\delta\tau)$ of expression (58).

Maximise the criterion $Cri_i(\delta\tau)$ to obtain $\delta\tau_{mi}=\tau_{mi}-\tau_{m1}$.

Unlike the first method described above, in this case we use the K outputs $u_{mk}$ and $\hat{s}'_{mk}(t)$ ($1\leq k\leq K$) of the space-time source separation. In addition, we only use the 1st N components of $u_{mk}$. i.e. the vector $u_{mk}^0$ (N number of antennas).

Simulation Example

In this example, we simulate the case of M=2 transmitters where one of the transmitters is composed of two paths. The two transmitters have the following characteristics in terms of incidences, delays and paths:

$1^{st}$ transmitter (m=1): composed of $P_1=2$ paths such that $\theta_{11}=60°$ $\theta_{12}32$ $75°$ and the delay $\tau_{11}=0$ $\tau_{12}=2$ samples QPSK NRZ with 10 samples by symbols.

Figure 8:
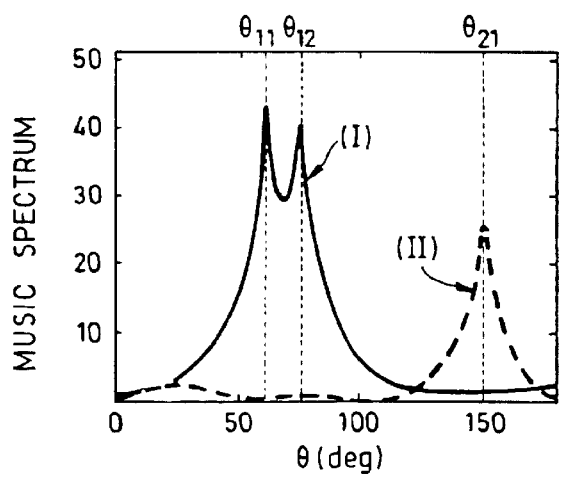

$2^{nd}$ transmitter (m=2): composed of $P_2=1$ paths such that $\theta_{21}=150$ and delay $\tau_{21}=0$ FIG. 8 represents the MUSIC pseudo-spectra on the matrices $R_{1i}$(curve I) and $R_{2i}$ (curve II) associated respectively with the first and second transmitters. The maxima of these pseudo-spectra can be used to determine the incidences $\theta_{mp}$ of the multipaths of these transmitters.

What is claimed is:

1. A method for space-time estimation of one or more transmitters based on signals received using an antenna network, said method comprising:

separating the signals received using the antenna network to obtain signals s(t);

grouping the signals s(t) by transmitter, said signals s(t) being from more than one transmitter; and determining an arrival angle $\theta_{mi}$ for each multipath $p_m$ transmitted by each transmitter, wherein the grouping the signals s(t) by transmitter includes intercorrelating components of the separated signals.

2. The method according to claim 1, wherein the intercorrelating includes intercorrelating two by two components $u_k(t)$ of a signal vector s' (t) resulting from separating the signals, and wherein the grouping the signals s(t) by transmitter further includes:

finding one or more delay values to obtain a maximum value for an intercorrelation function, $r_{kk'}(\tau)=E$; and storing path indices for which the intercorrelation function is a maximum.

3. The method according to one of claims 1 and 2 further comprising:

determining delay times using angles $\theta_{mi}$, a signal $s_m(t)$, and searching for a maximum of a criterion $Cri_i(\delta\tau)$ to obtain $\delta\tau_{mi}=\tau_{mi}-\tau_{ml}$, with $Cri_i(\delta\tau)=E[s_m(t)(i)s_m(t-\delta\tau)(1)^*]$.

4. The method according to one of claims 1 and 2, wherein $P_1=P_2=\ldots=Pm$, where $P_m=1$.

5. A method for space-time estimation of one or more transmitters based on signals received using an antenna network, said method comprising:

separating the signals received using the antenna network to obtain signals s(t) by using a space time method before determining the arrival angles $\theta_{mi}$ for each multipath $p_m$ of each transmitter; and comparing a signal $s_m(t)$ to an output of a filter of length $L_m$ before separating the signals, wherein said signals are from more than one transmitter.

6. The method according to claim 5, wherein the signal $s_m(t)$ is delayed for a given transmitter, and wherein the filter has inputs $s_m(t)$ to $s_m(t-\tau_m)$.

7. The method according to claim 5 or 6, further comprising:

identifying and eliminating outputs associated with a same transmitter after determining the arrival angles $\theta_{mi}$ for each multipath $p_m$ transmitted by the same transmitter.

8. The method according to one of claims 2 and 5, further comprising:

using a MUSIC type high resolution goniometry method by interferometry.

9. A storage medium for storing a computer readable program for space-time estimation of one or more transmitters based on signals received using an antenna network, said computer readable program comprising:

a first computer code configured to separate the signals received using the antenna network in order to obtain signals s(t);

a second computer code configured to group the signals s(t) by transmitter, said signals s(t) being from more than one transmitter;

a third computer code configured to determine an arrival angle $\theta_{mi}$ for each multipath $P_m$ transmitted by each transmitter; and a fourth computer code configured to intercorrelate components of the separated signals.

10. The storage medium according to claim 9, wherein the fourth computer code is further configured to intercorrelate two by two components $u_k(t)$ of a signal vector s'(t) resulting from the code to separate the signals, and wherein the second computer code comprises:

a fifth computer code configured to find one or more delay values to obtain a maximum value for an intercorrelation function, $r_{kk'}(\tau)=E[u_k(t)u_{k'}(t-\tau)^*]$; and a sixth computer code configured to store path indices for which the intercorrelation function is a maximum.

11. The storage medium according to claim 10, further comprising:

a seventh computer code configured to use a MUSIC type high resolution goniometry method by interferometry.

12. The storage medium according to claim 9 further comprising:

a fifth computer code to determine delay times using angles $\theta_{mi}$, a signal $s_m(t)$, and to search for a maximum of a criterion $Cri_i(\delta\tau)$ to obtain $\delta\tau_{mi}=\tau_{mi}-\tau_{ml}$, with $Cri_i(\delta\tau)=E[s_m(t)(i)s_m(t-\delta\tau)(1)^*]$.

13. The storage medium according to claim 9, wherein the first computer code and the second computer code are performed before the third computer code to determine the arrival angles $\theta_{mi}$.

14. The storage medium according to claim 13, further comprising:

a fifth computer code configured to compare a signal $s_m(t)$ to an output of a filter of length $L_m$ before the first computer code to separate the signals, wherein the signal $s_m(t)$ is delayed for a given transmitter, and wherein the filter has inputs $s_m(t)$ to $s_m(t-\tau_m)$.

15. The storage medium according to claim 13, further comprising:

a fifth computer code configured to identify and eliminate outputs associated with a same transmitter after the third computer code to determine the arrival angles $\theta_{mi}$ for each multipath $p_m$ transmitted by the same transmitter.

16. The storage medium according to claim 9, wherein $P_1=P_2=\ldots=Pm$, where $P_m=1$.

* * * * *